(No Model.)
L. SAUER.
HOE.
No. 313,244. Patented Mar. 3, 1885.
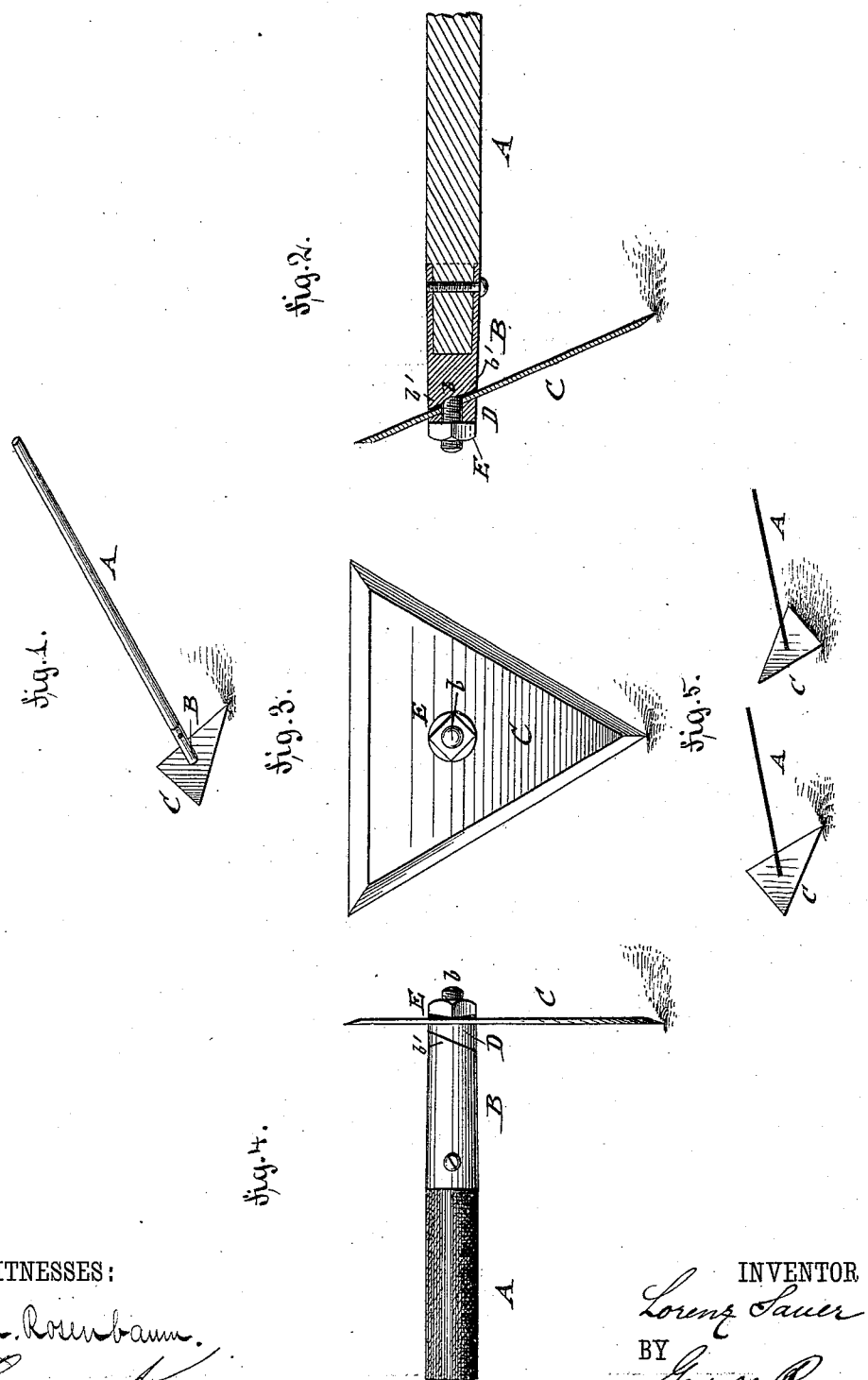

UNITED STATES PATENT OFFICE.

LORENZ SAUER, OF NAPA CITY, CALIFORNIA.

HOE.

SPECIFICATION forming part of Letters Patent No. 313,244, dated March 3, 1885.

Application filed October 25, 1884. (No model.)

*To all whom it may concern:*

Be it known that I, LORENZ SAUER, of Napa City, in the county of Napa and State of California, have invented certain new and useful Improvements in Hoes, of which the following is a specification.

This invention has reference to an improved gardener's hoe which can be used for different purposes, and by which the ground can be worked closely around the plants; and the invention consists of a triangular hoe with sharp edges, that is attached by an inclined washer and fastening screw-nut to a threaded screw-post of a ferrule at the end of the handle, as will be more fully described hereinafter and finally pointed out in the claim.

In the accompanying drawings, Figure 1 represents a perspective view of my improved hoe; Fig. 2, a vertical longitudinal section of the same on a larger scale; Fig. 3, an end view of Fig. 2; Fig. 4, a side view showing the hoe attached at right angles to the handle, and Fig. 5 perspective views showing different modes of using the hoe.

Similar letters of reference indicate corresponding parts.

A in the drawings represents the handle of my improved hoe, which is provided at the end with a metallic ferrule, B. The ferrule B is arranged with a central screw-post, $b$, and an inclined face or cheek, $b'$, against which the hoe C is secured by means of a washer, D, which has the same inclination as the face of the ferrule, and by a fastening screw-nut, E, as shown in Fig. 2.

The hoe C is made of steel, of triangular shape, and sharpened at its edges. It is placed by a center hole in the threaded shank of the ferrule B, and then fastened by the washer D and nut E.

When the hoe is to be secured at right angles to the handle A, the washer D is placed on the shank of the ferrule, and the hoe then screwed up against the rectangular side of the washer D by the fastening-screw E, as shown in Fig. 4.

My improved hoe can be used for working the ground with either one of its sides or points, the points being used when it is desired to loosen the ground close to the plants, while the sides are used when the ground is to be loosened between the plants.

Having thus described my invention, I claim as new and desire to secure by Letters Patent—

The combination of a handle, a ferrule having an inclined face and a threaded shank, a hoe-blade, a washer inclined at one side to correspond to the inclination of the face of the ferrule, and a fastening screw-nut for attaching the washer and hoe to the ferrule, substantially as set forth.

In testimony that I claim the foregoing as my invention I have signed my name in presence of two subscribing witnesses.

LORENZ SAUER.

Witnesses:
   FRED. DUNCK,
   BALZ NUFER.